March 26, 1968    J. B. KENNEDY    3,375,522
DIGITAL BEARING MEASURING SYSTEM
Filed Feb. 1, 1966                6 Sheets-Sheet 1

INVENTOR.
JOHN B. KENNEDY
BY Richard J. Seligman
ATTORNEY

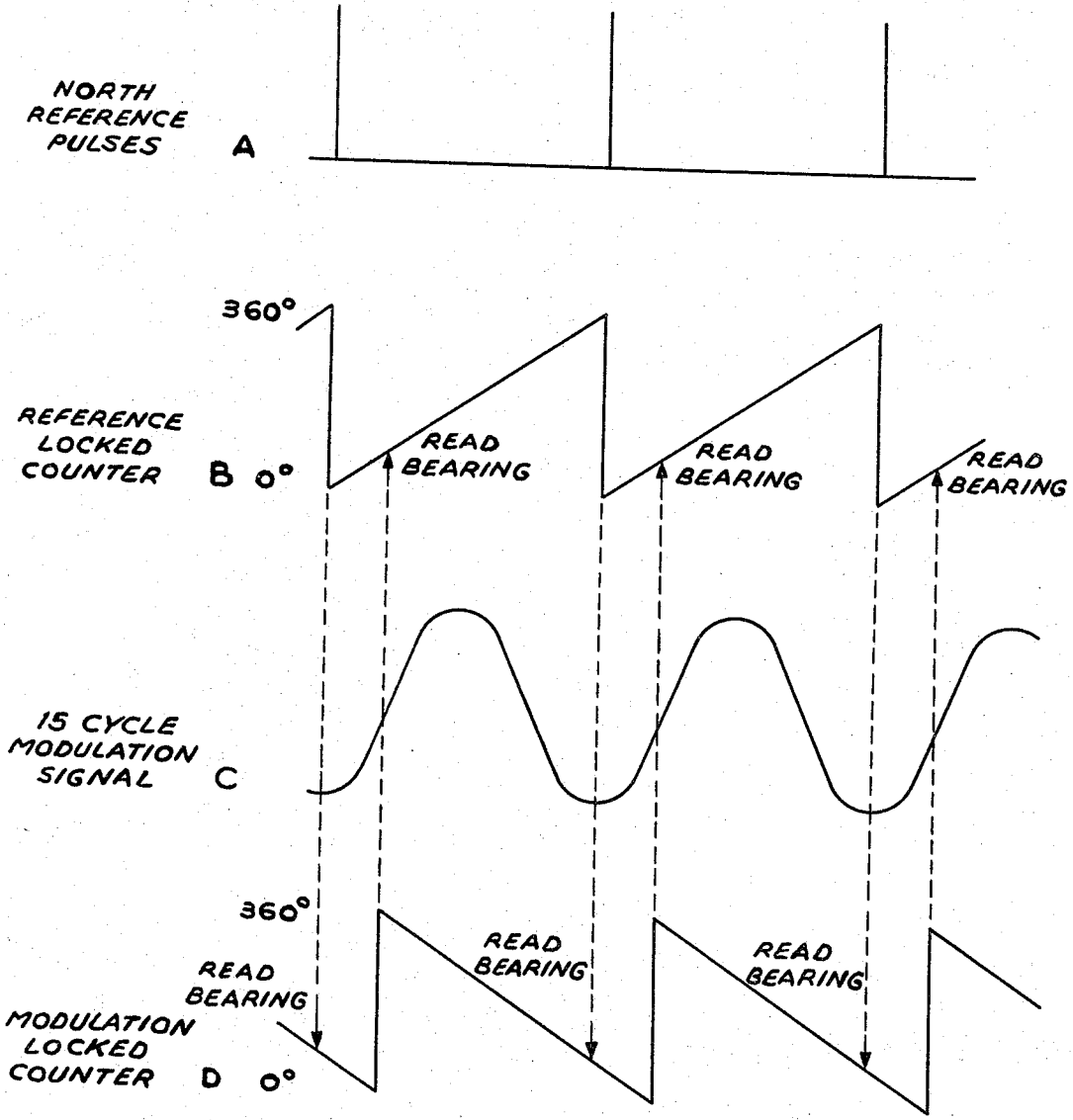

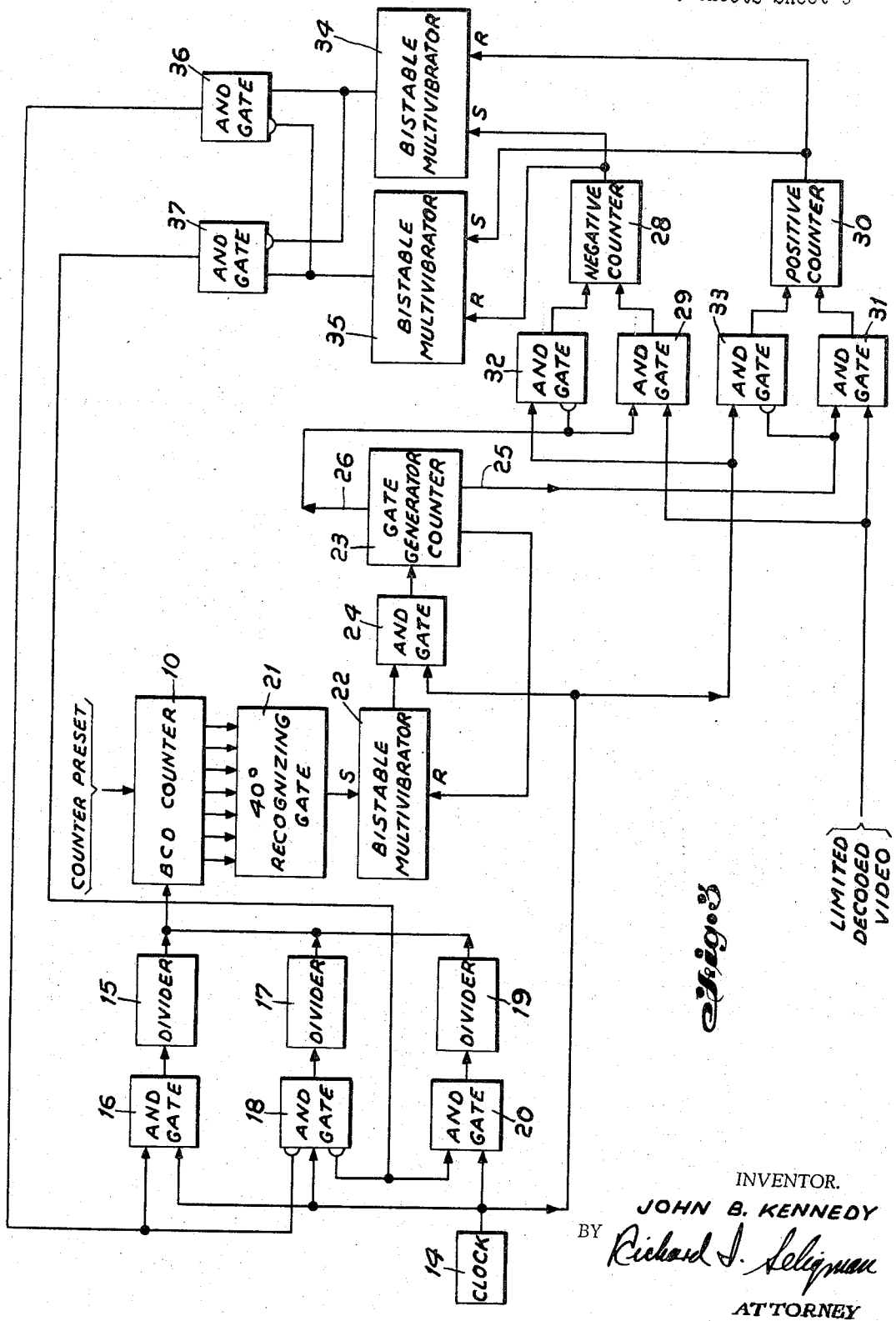

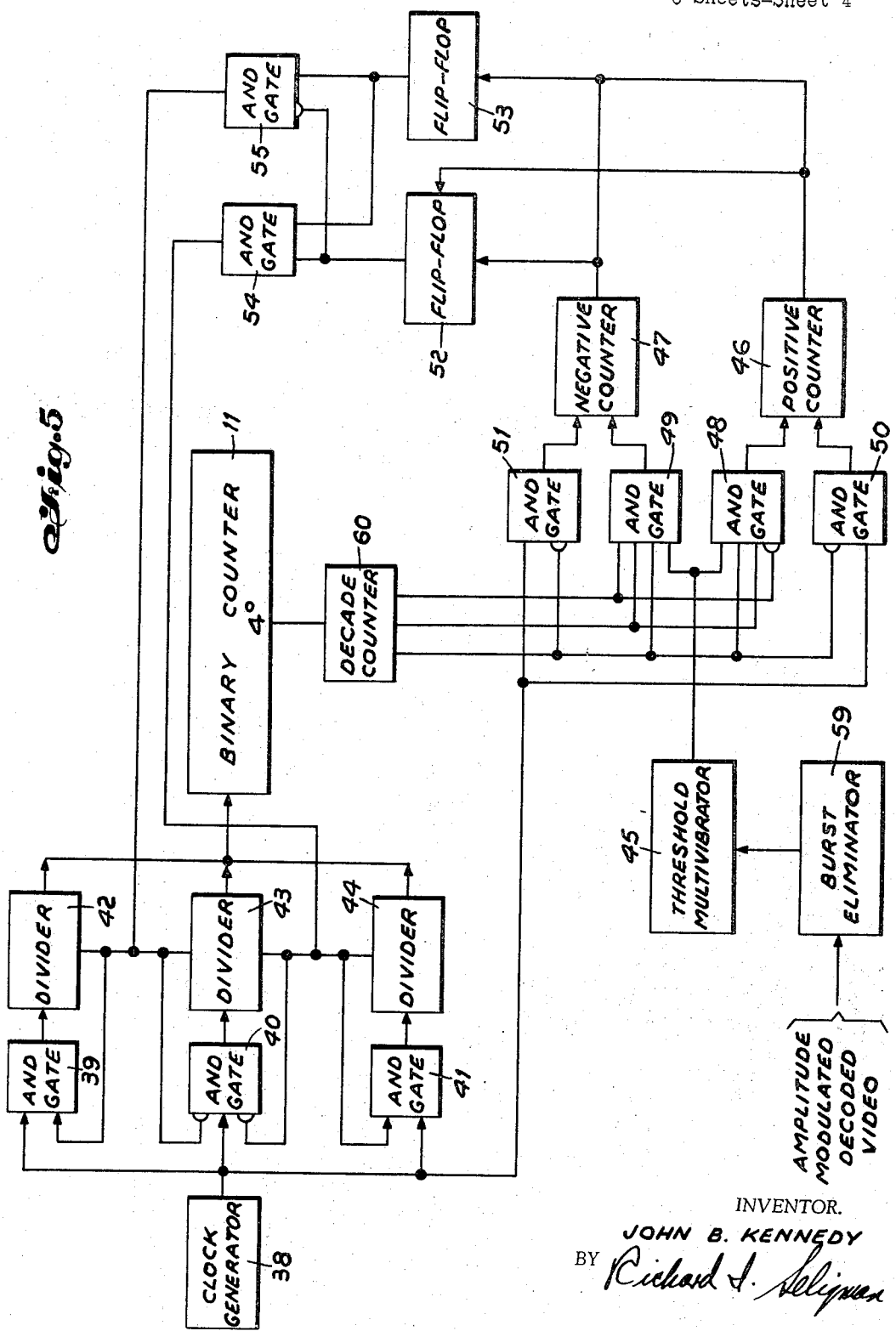

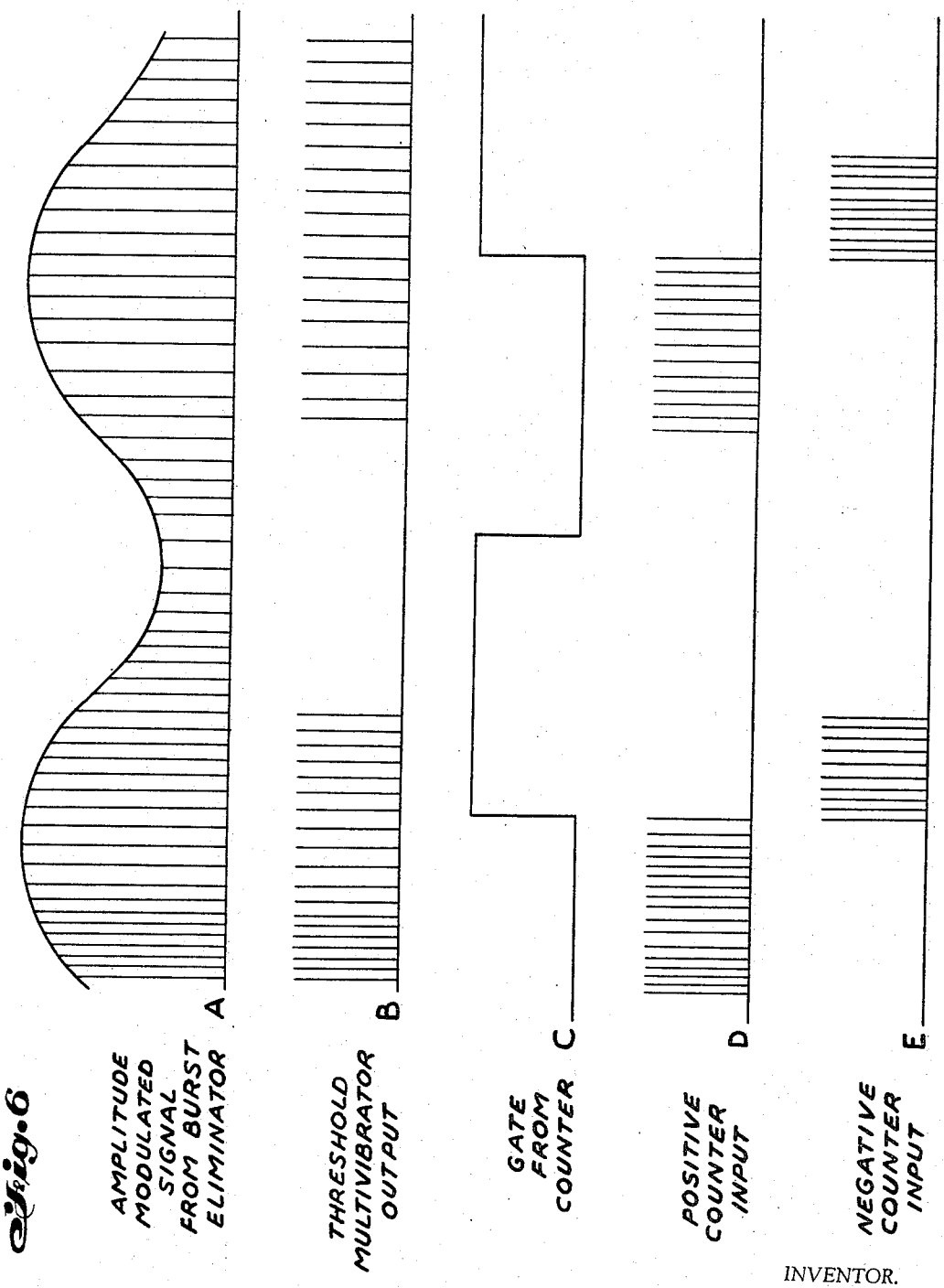

Fig. 7
COMPOSITE
ENVELOPE &
SINE WAVE
THRESHOLD    A
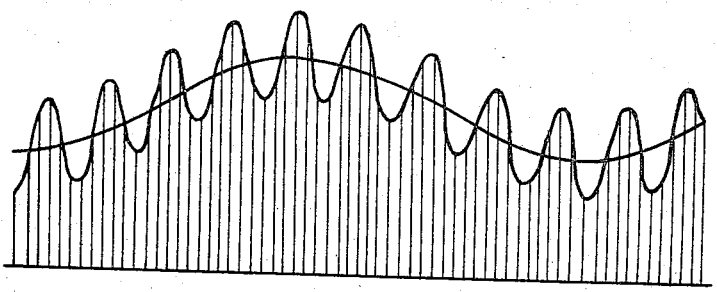
THRESHOLD
MULTIVIBRATOR
OUTPUT       B
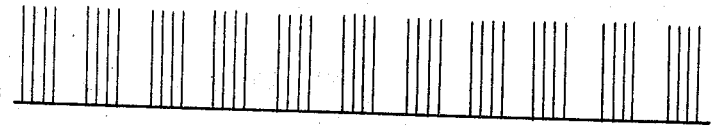
COMPOSITE
ENVELOPE &
SQUARE WAVE
THRESHOLD    C
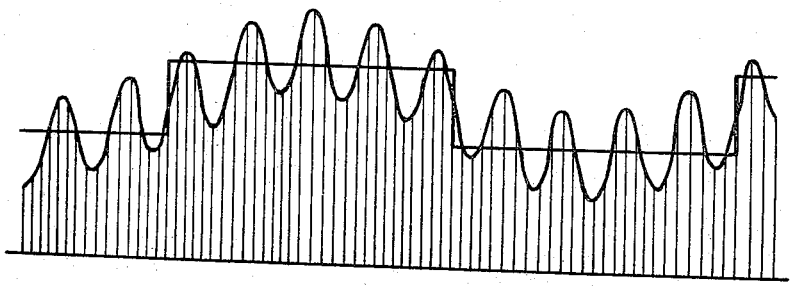
THRESHOLD
MULTIVIBRATOR
OUTPUT       D
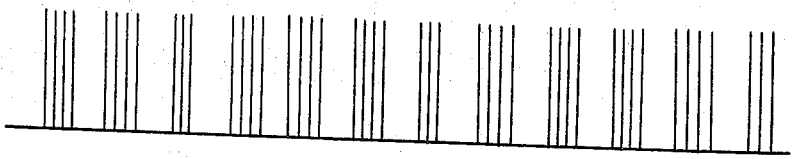
INVENTOR.
JOHN B. KENNEDY
BY Richard J. Seligman
ATTORNEY

United States Patent Office 3,375,522
Patented Mar. 26, 1968

3,375,522
DIGITAL BEARING MEASURING SYSTEM
John B. Kennedy, Montville, N.J., assignor to International Telephone and Telegraph Corporation, Nutley, N.J., a corporation of Maryland
Filed Feb. 1, 1966, Ser. No. 524,106
12 Claims. (Cl. 343—106)

ABSTRACT OF THE DISCLOSURE

A receiver for a digital Tacan bearing measuring system in which two counters are frequency and phase locked to the reference bursts and the bearing envelope, respectively, such that the count difference between the two counters continually represents bearing.

This invention relates to aerial navigation bearing systems and more particularly to a digital bearing measuring system.

In certain aerial navigation systems such as Tacan, described in vol. 33, March 1956, of "Electrical Communication," the technical journal of the International Telephone and Telegraph Corporation and associated companies, azimuthal information is given by the relative phase between reference signals and a multi-lobed rotating antenna pattern which phase varies at different azimuthal positions with respect to the beacon. The beacon transmits several different types of pulse signals which the airborne radio set translates into bearing and distance information. The transmitting antenna system in the beacon produces a multi-lobed directional pattern rotating at about 15 cycles per second. To a receiver receiving the pulse signals from the transmitter, the rotation of the antenna pattern produces an amplitude modulation envelope on these pulses. When the major lobe of the directional pattern points in a given direction, such as north, a special signal in the form of a short burst of pulses is transmitted from the beacon, which signal is referred to as the "north reference signal." By comparing the phase of the modulation envelope, due to rotation of the beacon pattern, with that of the north signal, an indication of the bearing of the receiver with respect to the beacon is obtained. If only the north signal and a single-lobed directional pattern were employed, only a relatively coarse indication of bearing would be obtainable. To obtain a finer indication, the directional pattern is multi-lobed with each lobe separated, for example by 40° from the next, and with auxiliary reference pulse signals in the form of short bursts of pulses being emitted each time one of these lobes passes the predetermined reference points (for example, the north) as the antenna pattern is rotated. The rotation of this pattern produces a modulation envelope of 135 cycles per second (9 lobes multiplied by 15 cycles per second) on top of the fundamental of 15 cycles per second due to the main directive lobe. By comparing the phase of the auxiliary pulse signal with respect to that of the 135 cycle per second modulation envelope a fine azimuthal indication is obtained.

The standard prior art Tacan system makes use of primarily analog techniques to measure bearing, and detection of the received modulation envelope is accomplished using circuitry for peak riding and audio filtering. These circuits have in the past been major sources of bearing error. Furthermore, the use of analog techniques subject the equipment to noise and jamming which are usually random in nature.

Accordingly, it is an object of the present invention to provide a novel bearing measuring system using primarily digital techniques.

In achieving the foregoing object, the present invention provides a receiver having two counters which are so synchronized to reference and modulation signals respectively that the count difference between the two counters continually represents bearing.

A feature of this invention is a receiver which includes one counter, frequency and phase-locked to the received reference burst signals, and a second counter which is frequency and phase-locked to the bearing envelope.

The above-mentioned and other features and objects of this invention will become more apparent by reference to the following description taken in conjunction with the accompanying drawings, in which:

FIGURE 2 is a series of waveforms illustrating the principles of operation of the inventive digital bearing receiver;

FIGURE 3 is a block diagram illustrating the circuit for phase-locking the reference counter of FIGURE 1;

FIGURE 5 is a block diagram illustrating the circuit for phase-locking the modulation counter of FIGURE 1.

FIGURE 6 is a series of waveforms employed in the operation of the circuit of FIGURE 5;

FIGURE 7 is a series of waveforms illustrating envelope extraction thresholding with a composite signal.

General description

Figure 1:
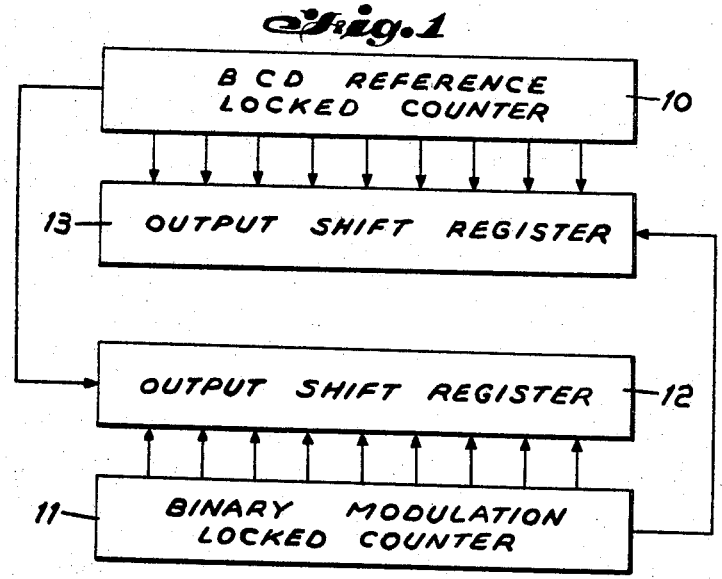
FIGURE 1 is a simplified block diagram illustrating a portion of a novel digital bearing receiver.

FIGURES 1 and 2 illustrate the novel digital bearing measuring system and operation thereof respectively. A binary coded decimal (BCD) counter 10 (the phase-locked reference counter) is phase-locked to the north reference signal, waveform A in FIGURE 2, and counts upward through a 360° cycle at a 15 cycle per second rate. Counter 10 is adjusted in phase so that it passes through 0° at the arrival of the north reference group, as illustrated in waveform B of FIGURE 2. Although only phase-locking to the north reference group is shown, this counter is also phase-locked to the auxiliary reference groups, as shown hereinafter. This latter step enhances accuracy and signal-to-noise ratio characteristics.

A second counter 11 (the phase-locked modulation counter) is phase-locked to the modulation envelope, waveform C of FIGURE 2, and counts down through a 360° cycle at a 15 cycle per second rate. Counter 11 is adjusted in phase so that it passes through 0° at the arrival of the 135 cycle, 0° cross-over closest to the 15 cycle, 0° cross-over. The quantity held in counter 11 is illustrated in waveform D of FIGURE 2. Although only the 15 cycle signal is shown, the counter is also more accurately phase-locked to the 135 cycle fine information.

It can be seen from FIGURE 2 that the quantity held in reference counter 10 when modulation counter 11 is zero is the measured bearing. Also, the quantity held in modulation counter 11 when reference counter 10 is zero is the measured bearing. If reference counter 10 is constructed in a BCD (binary coded decimal) format and modulation counter 11 is constructed with a binary format, opportunity for reading in either BCD or binary exists. Therefore, no additional decoding circuitry is required to provide BCD for a digital panel indicator or binary for a computer input. When reference counter 10 reaches zero, the data in modulation counter 11 can be transferred into a binary output shift register 12 (Figure 1); likewise when modulation counter 11 reaches zero, the data in reference counter 10 can be transferred into a BCD output shift register 13.

Phase-locking the reference counter

The circuit for phase-locking of reference counter 10 to the reference groups is shown in FIGURE 3. BCD counter 10 is adjusted with a least significant bit of .050, and a cycle length of 360°. An input clock generator 14 causes circulation through an entire cycle of counter 10 at a rate of 15 cycles per second.

Initially counter 10 is pre-set to zero on the initial arrival of a north reference group for accelerated acquisition (note: The system will perform properly without initial preset but a significantly longer period of time is required to accomplish phase-locking). The preset signal is derived by recognition of the peculiar pulse spacings of the north reference burst in a decoder circuit not herein described. Since counter 10 is preset to zero, when a north group is received, it can be expected that the next north reference group should be received when the counter again reads zero. Further, the auxiliary reference groups should be received when the counter reads 40°, 80°, 120°, 160°, 200°, 240°, 280° and 320°. Tracking is accomplished by opening two gates during the anticipated reference group arrival time, and making minor adjustments to the counter phase to insure that the reference group remains centered in these gates. The auxiliary reference group consists of a burst of 11 pulses, therefore true centering never occurs and the counter phase is always adjusted somewhat; of course, this will average out since one time 6 pulses will occur in one gate and another time in the other gate. The north reference group consists of twelve pulses and can be centered, 6 pulses in each gate.

The circuit employed for phase-locking of reference counter 10 comprises a clock 14 the output thereof being coupled to a divider 15 via a gate 16, to a divider 17 via a gate 18 and to a divider 19 via a gate 20, the outputs from the dividers being coupled to the input of BCD counter 10. A gate 21 is coupled to counter 10 for recognizing the 40° points thereof, gate 21 comprising a plurality of AND gates. The output from gate 21 is connected to a bistable multivibrator 22. The output from bistable multivibrator 22 is coupled to a counter 23 (hereinafter termed gate generation counter 23) via a gate 24; gate 24 having as a second input thereto an output from clock generator 14. Gate generation counter 23 forms a positive gate pulse 25 and a negative gate pulse 26 (positive and negative referring to the group of components which when active cause decreasing and increasing of the counter velocity rate) and also provides an output 27 for the resetting of bistable multivibrator 22. Negative gate pulse 26 enables a gate 29 to pass the limited decoded video signal to a counter 28; likewise positive gate pulse 25 enables a gate 31 to pass the limited decoded video signal to a counter 30. Second inputs to counters 28 and 30 are received from clock generator 14 via gates 32 and 33 respectively when gate pulses 26 and 25 respectively are not inhibiting same. The output from negative counter 28 is applied to the set terminal of a bistable multivibrator 34 and to the reset terminal of a bistable multivibrator 35; similarly the output from positive counter 30 is applied to the set terminal of bistable multivibrator 35 and to the reset terminal of bistable multivibrator 34; multivibrators 34 and 35 in a preferred embodiment are J-K flip-flops. The output from bistable multivibrator 34 provides an enable signal for gate 16 via a gate 36; likewise the output from bistable multivibrator 35 provides an enable signal for gate 20 via a gate 37. The output from bistable multivibrator 34 is also used to inhibit gate 37, and likewise the output from bistable multivibrator 35 is used to inhibit gate 36. Output signals from either of gates 36 or 37 also inhibit gate 18.

Figure 4:
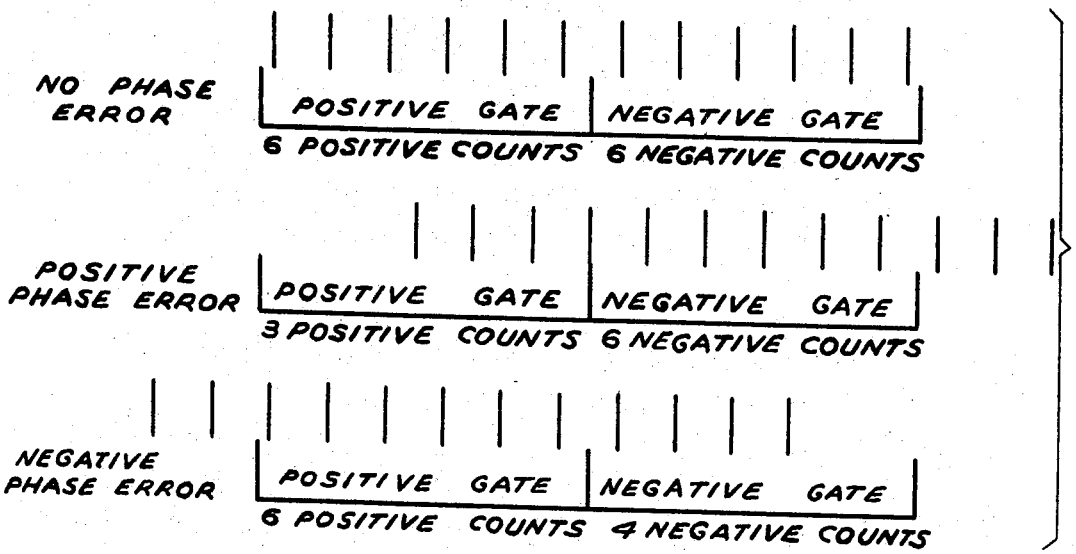
FIGURE 4 is a series of diagrams illustrating the principles of adjusting the reference counter phase to coincide with the reception of the reference groups.

Operation of the above-described circuit is explained with reference to FIG. 4. BCD counter 10 can be assumed to be initially counting the pulses from clock generator 14 through divider 17. This combination insures that counter 10 cycles at precisely a 15 cycle per second rate. Just before each 40° point on counter 10, bistable multivibrator 22 is trigged to enable gate 24 which starts gate generation counter 23 counting. Two gate pulses are produced by gate generation counter 23. A positive gate pulse 25 and negative gate pulse 26, as shown in FIGURE 4. The gate pulses are approximately 2° wide lying either side of each 40° point on the cycle of counter 10. Decoded pulses are counted in negative counter 28 and positive counter 30 during the gate pulses 26 and 25 respectively. If counter 10 is exactly on time when the reference groups arrived, an equal number of pulses are counted in each counter 28 and 30. These counters are then driven to zero by the clock pulses via gates 32 and 33. They reach zero simultaneously and the flip-flops 34 and 35 do not enable gates 36 or 37 thus permitting BCD counter to continue cycling at a 15 cycle per second rate. As mentioned above this will never occur with the auxiliary reference bursts since there are 11 pulses per burst and exact centering in the two counters cannot occur. If the reference group is somewhat shifted in time with respect to the counter reference, a higher count is accumulated in one of the gated counters 28 and 30 than the other. When they are circulated towards zero, they reach zero at different times thus producing a gate at either bistable multivibrator 34 or 35. During this gate, counter 10 receives its clock pulses through divider 15 or divider 19 instead of through divider 17, divider 15 being higher and divider 19 being lower than the correct ratio to cycle the counter at a 15 cycle per second rate. Thus, the cycle of counter 10 can be shortened or lengthened by altering the division during this bistable gate. This correction process is repeated until the counter is properly phased to the reference groups. Corrections of this type are made to both the north end auxiliary reference groups.

This correcting process will continue to phase-lock counter 10 to the reference groups, even though the beacon antenna frequency may vary somewhat from 15 cycles per second. In this case the counter cycle will continually be the beacon antenna speed, and not necessarily precisely 15 cycles per second.

Phase-locking the modulation counter

The scheme for phase-locking modulation binary counter 11 to the modulation envelope is very similar to that already described for phase-locking reference counter 10 and is illustrated in FIGURE 5. A clock generator 38 is coupled to binary counter 11 via gates 39, 40 and 41 and divider networks 42, 43 and 44 respectively. The amplitude modulated decoded video signal is applied to a threshold multivibrator 45 via a burst eliminator 59 (to be described hereinafter). A pair of gating pulses is derived from binary counter 11 by employing a decade counter 60 counting from a bit on the cycle of counter 11, e.g., the 4° bit. The output from threshold mulitvibrator 45 is applied with these gating pulses to drive a positive counter 46 and a negative counter 47 via AND gates 48 and 49 respectively. Clock generator 38 is also employed to drive counters 46 and 47 via gates 50 and 51 respectively when not inhibited by gating pulses from counter 60. The output from counters 46 and 47 are coupled to bistable mutlivibrator 53 and 52 which can be J-K flip-flops. The output from flip-flops 52 and 53 are coupled to gates 41 and 39 respectively via gates 54 and 55.

Operation of the circuit of FIG. 5 is explained with the aid of FIGURES 6 and 7. The Tacan beacon signal consists of a train of essentially random pulses modulated by an AM envelope.

Consider first the Tacan decoded video signal with reference groups eliminated and a 15 c.p.s. modulation component but no 135 c.p.s. modulation. This signal is shown as waveform A in FIGURE 6. If this signal is fed to a one-shot multivibrator, then the multivibrator will give an output pulse whenever an input pulse exceeds the triggering threshold. By controlling the quiescent bias on the multivibrator input, the threshold can be adjusted at any level, such as the 0° and 180° points. The output of such a multivibrator is shown by waveform B of FIGURE 6. It should be recognized that should the triggering threshold drift multivibrator outputs will remain symmetrical about the peak of the modulation envelope.

The random distribution of the received pulses in the Tacan signal may cause more pulses to fall on one side of the peak than the other in any given cycle. However, when this distribution is averaged over many cycles, an equal number of pulses will be found to fall on either side of the peak. Any pulse groups that disturb this random distribution must be eliminated from the video signal. Therefore a burst eliminator is provided to eliminate the reference groups from this signal.

Binary counter 11 with a least significant bit of .05 degrees and a cycle length of 360 degrees is fed a constant stream of clock pulses originating in clock generator 38, which pulses are divided down by divider 43. The clock frequency and division ratio are chosen so that the counter will count through a complete cycle at exactly a 15 cycle per second rate. A gate is formed counter 11 such that its period is 360° and it starts at 90° and runs to 180°. The gate is illustrated by waveform C of FIGURE 6.

The amplitude modulated decoded video signal is fed to burst eliminator 59. The output of burst eliminator 59 which is shown by waveform A of FIGURE 6 is coupled to threshold multivibrator 45. Multivibrator 45 will be triggered by pulses greater than a predetermined threshold amplitude. The output of threshold multivibrator (waveform B in FIGURE 6) is then gated with the counter generated gate and its complement. The output of these gates, shown in waveforms D and E of FIGURE 5, are coupled to positive and negative correcting counters 46 and 47 respectively. The number of counts fed to each counter will not be equal unless the counter generated gate started at either the positive or the negative peak of the modulation envelope. The unequal counts of the negative or positive counter due to the gate not beginning at the peak of the envelope will be used to serve the phase of counter 11 until the gate does line up with the peak of the modulation envelope.

The gated random counts are entered into the positive and negative correcting counters. These counters are then driven toward zero by entering clock pulses from clock 38 into the counters via gates 50 and 51. A gate is produced for the length of time after one counter reaches zero or until the second arrives at that point. If there has been no initial difference in count, corresponding to the counter generator gate falling at the peak of the modulation, no correcting gate is produced. However, if the counter generated gate was not at the peak a correcting gate is generated. The correcting gate inhibits clock pulses from passing through divider chain 43 and substitutes divider chain 42 or 44 depending on whether the negative or positive correcting counter 46 and 47 reached zero first. Divider 42 is higher, and divider 44 is lower than the correct ratio to cycle the counter at a 15 c.p.s. rate. Thus the binary counter cycle is lengthened or shortened by altering the division ratio during the correcting gate. This correction process is repeated until the counter is properly phased to the modulation envelope. The process described permits the integration by dividing down the correcting effect of the input video signal.

It should be pointed out that like the reference recovery process, an antenna speed error cannot cause an error since the correcting counters acquire a bias which shortens or lengthens every counter cycle causing the binary counter to circuate at exactly the same rate as the beacon antenna speed.

Operation with 135 c.p.s. modulation recovery circuits is not different from 15 cycle per second operation. The initial search operation is performed with the composite video signal feeding a threshold multivibrator while a fixed bias is maintained. The presence of the 135 cycle per second signal does not change the measured phase from that obtained with 15 cycle per second information only. Once 15 cycle per second lock-on has been achieved as shown by nearly an equal number of video pulses being gated into the two correcting counters 46 and 47, the circuit is switched to 135 c.p.s. track operation. This is accomplished by changing the nature of the bias on the threshold multivibrator. FIGURE 7 illustrates this operation. It can be seen in waveform A in FIGURE 7, that if a 15 cycle bias in phase with the 15 cycle modulation component is applied to the threshold multivibrator that only pulses about the peak of the 135 cycle components will be regenerated by the threshold multivibrator as shown in waveform B of FIG. 7. However, a 15 cycle sine wave is not readily obtained. It can be shown that a 15 cycle square wave can be applied as a bias to the threshold multivibrator as shown in waveform C of FIGURE 7. This will again permit pulses lying near the peaks of 135 cycle per second components to be regenerated by the threshold multivibrator (waveform D of FIGURE 7). The use of a square wave instead of a sine wave to produce the threshold bias does not induce any error although some cycles may seem to contribute pulses unsymmetrically, this component is integrated out over an entire 15 cycle per second period.

The square wave used for threshold biasing is obtained directly from the binary counter chain. Its amplitude must be varied to obtain full sensitivity over varying depths of modulation. Control of the amplitude of the square wave is maintained by ensuring that a nearly constant count is entered into the correcting counters.

The correction process with 135 cycles per second information is performed identically as done with 15 cycle per second information only. The only change required is that the counter generated gate occurs at 135 cycle per second rate and is begun at 30°, 70°, 110°, 150°, 190°, 230°, 270°, 310°, and 350° points.

When a phase error exists between the 15 cycle per second and 135 cycle per second modulation components due to siting reflections, the counter will read the 15-c.p.s. bearing first and will then be pulled slightly to the nearest correct fine (135-c.p.s.) bearing. When this condition exists the 15-c.p.s. thresholding square wave will not be in exact phase with the received 15-c.p.s. component of the composite envelope, however no errors will result since they are cancelled out by the symmetry of the detection method.

Figure 8:
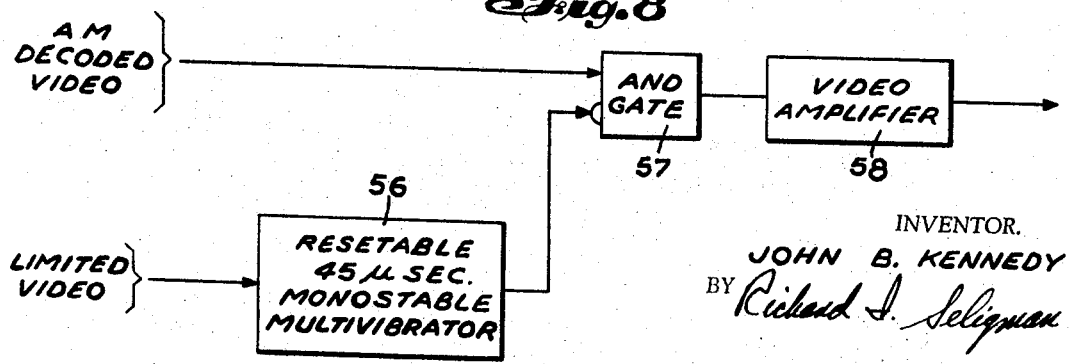
FIGURE 8 is a block diagram illustrating a burst eliminator employed in the circuit of FIGURE 5.

FIGURE 8 illustrates one embodiment of the burst eliminator employed in the circuit of FIG. 5. The inputs to this circuit are the amplitude modulated video and amplitude limited video which is delayed from the first signal by about 4 microseconds. Each pulse of limited video triggers a 45 microsecond resetable monostable multivibrator 56. With this type of multivibrator a 45 microsecond gate is initiated by each input pulse. Even if multivibrator 56 is still "on" due to a previous pulse, it will remain "on" for 45 microseconds after the arrival of a new pulse. The amplitude modulated video is fed to an AND gate 57. If no output is present from multivibrator 56 this signal passes through the gate and is linearly amplified by a video amplifier 58. If multivibrator 56 is "on," no signal will be permitted to reach the input of video amplifier 58.

While I have described above the principles of my invention in connection with specific apparatus, it is to be clearly understood that this description is made only by way of example and not as a limitation on the scope of my invention as set forth in the accompanying claims.

I claim:

1. In a bearing measuring system adapted to detect bearing information from a beacon emitting a complex rotating signal including a reference signal and a main bearing signal, a receiver comprising:

means for receiving said main bearing signal and said reference signal;

a first counter;

means coupled to said first counter and to said receiving means to phase-lock said first counter to said reference signal;

a second counter;

means coupled to said second counter and to said receiving means to phase-lock said second counter to said main signal; and means responsive to the quantities held in said first and second counters for yielding measurement of bearing.

2. In a bearing measuring system according to claim 1 wherein said beacon rotates at a predetermined rate emitting a complex signal including a reference signal occurring whenever the beacon orients in a predetermined direction and a main directional signal and wherein said means to phase-lock said first counter to said reference signal comprises means for causing said first counter to pass through zero degrees at the arrival of said reference signal.

3. In a bearing measuring system, a receiver as in claim 2 in which said counters have a 360 degree cycle and a period equal to the period of rotation of said beacon.

4. A receiver as in claim 2 wherein said first counter counts upwards at a rate substantially equal to the rate of rotation of said beacon and said second counter counts down at the same rate.

5. In a bearing measuring system, a receiver as in claim 2 wherein said beacon emits a complex signal including a fundamental wave, a harmonic wave, and spaced main and auxiliary reference pulses having predetermined repetition frequencies equal to the frequencies of said fundamental and harmonic waves respectively in which said first counter has a 360 degree cycle and a period equal to the frequency of said fundamental wave of beacon signal and is phase-locked to said main reference pulses so that said counter passes through zero degrees at the arrival of said reference pulses; and said second counter has a 360 degree cycle and a period equal to the frequency of said fundamental wave of beacon signal and is phase-locked to said fundamental and harmonic waves so that said second counter passes through zero degrees at the arrival of the zero degree crossover of said harmonic wave closest to the zero degree crossover of said fundamental wave.

6. A receiver as in claim 5 wherein said first counter is also phase-locked to said auxiliary reference pulses.

7. In a bearing measuring system, a receiver as in claim 5 wherein said means to phase-lock said first counter to said reference signal so that said counter passes through zero degrees at the arrival of said reference signal includes gate forming means coupled to said first counter to form two gates at the anticipated arrival time of said main and auxiliary reference pulses during the counter cycle, means for applying the reference pulses during the gating period to determine if the reference pulses fall into the gates symmetrically, and means to adjust the phase of said first counter in response to any asymmetrical centering of the reference pulses in the gates.

8. In a bearing measuring system, a receiver as in claim 5 wherein said means to phase-lock said second counter to said fundamental and harmonic waves, includes a threshold detector, means to apply the received fundamental and harmonic waves to said threshold detector, means to cycle said second counter at a predetermined rate, means to generate gates on said counter cycle, means to gate the output of said threshold detector with said generated gates, and means to advance or retard said second counter in response to any asymmetrical centering of the threshold detector output in said generated gates.

9. In a bearing measuring system, a receiver as in claim 5 in which said means to phase-lock said first counter to said reference so that said counter passes through zero degrees at the arrival of said main reference signal, includes gate forming means coupled to said first counter to form two gates at the anticipated arrival time of said main and auxiliary reference pulses during the counter cycle, means for applying reference pulses during the gating period to determine if the reference pulses fall into the gates symmetrically, and means to adjust the phase of said first counter in response to any asymmetrical centering of the reference pulses in the gates; and said means to phase-lock said second counter to said fundamental and harmonic waves includes a threshold detector, means to apply the received fundamental and harmonic waves to said threshold detector, means to cycle said second counter at a predetermined rate, means to generate gates on said counter cycle, means to gate the output of said threshold detector with said generated gates, and means to advance or retard said second counter in response to any asymmetrical centering of the threshold detector output in said counter generated gates.

10. A receiver as in claim 2 wherein said first counter is constructed in BCD (binary coded decimal) format and said second counter is constructed with a binary format, thus providing for reading of bearing in either BCD or binary without additional decoding.

11. A receiver as in claim 2 wherein said means to phase-lock said first counter to said reference signal includes means to preset said first counter to zero and a clock generator coupled to said first counter to cause circulation through an entire cycle of said first counter at a rate equal to the nominal rate of rotation of said beacon.

12. In a bearing measuring system, a receiver as in claim 2 wherein said means to phase-lock said first counter to said reference signal so that said counter passes through zero degrees at the arrival of said reference signal includes means to signify the period during the cycle of said first counter when the arrival of a reference signal is expected; means to signify the period when a reference signal is actually received; and means to shift the phase of said first counter so that the period during the cycle of said first counter when the arrival of a reference signal is expected coincides with the period when a reference signal is actually received.

References Cited

UNITED STATES PATENTS

| 2,924,822 | 2/1960 | De Faymoreau et al. | 343—106 |
| 3,218,553 | 11/1965 | Peterson | 324—68 |
| 3,218,560 | 11/1965 | Peters | 324—68 |
| 3,267,473 | 8/1966 | Galloway | 343—106 |

RODNEY D. BENNETT, *Primary Examiner.*

H. C. WAMSLEY, *Assistant Examiner.*